United States Patent
Mizoguchi

(10) Patent No.: US 9,602,790 B2
(45) Date of Patent: Mar. 21, 2017

(54) OPTICAL DEVICE AND IMAGE DISPLAY APPARATUS

(71) Applicant: Seiko Epson Corporation, Tokyo (JP)

(72) Inventor: Yasushi Mizoguchi, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 14/755,332

(22) Filed: Jun. 30, 2015

(65) Prior Publication Data

US 2016/0004071 A1    Jan. 7, 2016

(30) Foreign Application Priority Data

Jul. 1, 2014    (JP) .................................. 2014-135870

(51) Int. Cl.
*H04N 9/31* (2006.01)
*G02B 26/08* (2006.01)
*G02B 26/10* (2006.01)
*G02B 27/10* (2006.01)
*G02B 27/14* (2006.01)

(52) U.S. Cl.
CPC ....... *H04N 9/3197* (2013.01); *G02B 26/0816* (2013.01); *G02B 26/0875* (2013.01); *H04N 9/3129* (2013.01); *G02B 26/101* (2013.01); *G02B 27/1046* (2013.01); *G02B 27/149* (2013.01)

(58) Field of Classification Search
CPC  G02B 26/0816; G02B 26/101; G02B 26/105; G02B 26/0841; G02B 26/0858; G02B 26/0875; G02B 27/1046; G02B 27/149; B41J 2/471; H04N 9/3129; H04N 9/3197
USPC ................. 359/198.1–199.4, 200.6–200.8, 359/209.1–215.1, 221.1–226.2
See application file for complete search history.

(56) References Cited

U.S. PATENT DOCUMENTS 8,526,098 B2 * 9/2013 Hofmann .............. B81B 3/0054
359/291
2011/0234650 A1    9/2011 Watanabe

FOREIGN PATENT DOCUMENTS

JP    2011-158589 A    8/2011
JP    2011-203460 A    10/2011

* cited by examiner

*Primary Examiner* — James Phan
(74) *Attorney, Agent, or Firm* — Harness, Dickey & Pierce, P.L.C.

(57) ABSTRACT

An optical device includes: an optical unit that is configured as a plate and includes a light incidence face on which light is incident; a support unit that includes a recessed arrangement portion in which the optical unit is arranged; and a first shaft portion and a second shaft portion that support the support unit in a manner which enables the support unit to oscillate, wherein a side face of the arrangement portion is separated from the optical unit between the optical unit and the first shaft portion and between the optical unit and the second shaft portion.

20 Claims, 13 Drawing Sheets

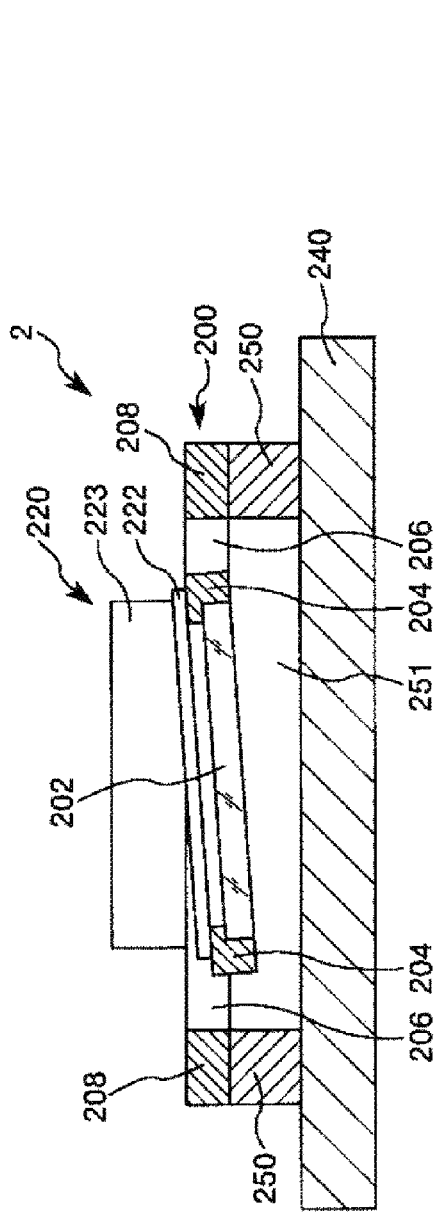
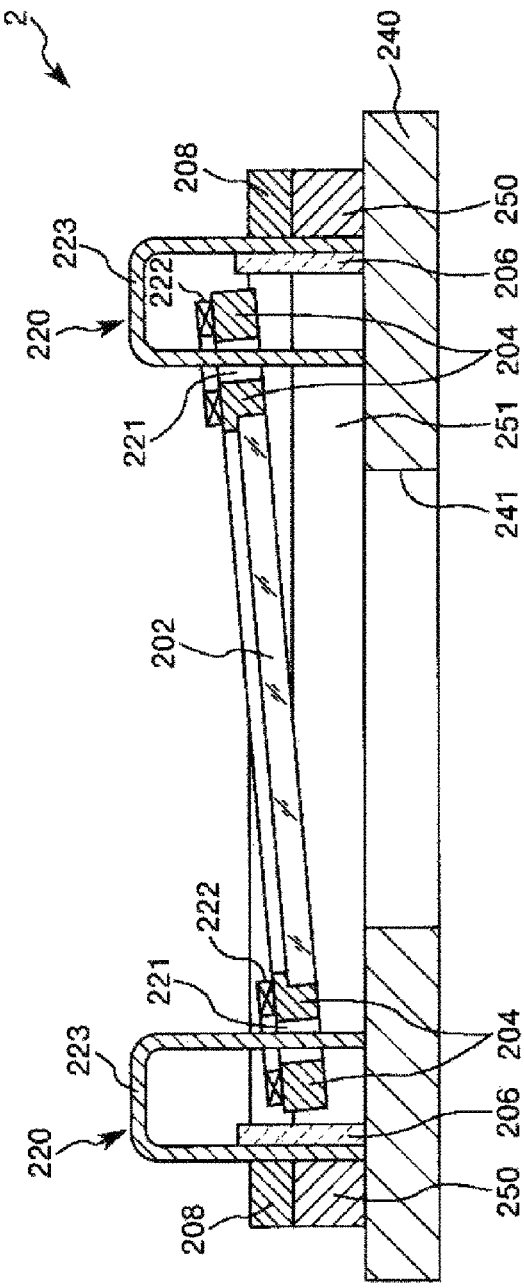
FIG. 7A
FIG. 7B

OPTICAL DEVICE AND IMAGE DISPLAY APPARATUS

BACKGROUND

1. Technical Field

The present invention relates to an optical device and an image display apparatus.

2. Related Art

In recent years, as an image display apparatus such as a projector, there has been known an apparatus that displays an image including multiple pixels by enlarging the image through an optical system such as a lens.

Such an image display apparatus generally uses a method of increasing the pixel density by shrinking each pixel and increasing the number of pixels so as to improve resolution. However, since it is difficult to configure smaller pixels, the method has a problem in that, for example, the yield is decreased, or the manufacturing cost rises.

An image display apparatus is disclosed in JP-A-2011-158589 with consideration of such a problem. The image display apparatus is provided with an optical device, a so-called image shifting device (image shifter), that shifts the position of capture of an image generated by image forming elements. Accordingly, it is possible to increase the resolution of a displayed image without increasing the pixel density.

The optical device disclosed in JP-A-2011-158589 includes a glass plate that changes the optical path of light, a holding member that holds the glass plate, and two flat springs that support the holding member. The optical path of light transmitted through the glass plate can be shifted by oscillating the glass plate that is fixed to the holding member around the two flat springs as the axis of oscillation. Accordingly, it is possible to shift the position of capture of a generated image by shifting the optical path.

In the optical device disclosed in JP-A-2011-158589, however, since it is hard to form the glass plate at predetermined dimensions, it is difficult to cause the entire side face of the glass plate to about evenly on the holding member. Thus, the two flat springs have different rigidities, and the glass plate does not oscillate uniformly. Accordingly, the stability of the optical path is decreased, and this poses a problem in that the quality of a displayed image is decreased.

SUMMARY

An advantage of some aspects of the invention is to provide an optical device having a highly stable optical path and an image display apparatus that is provided with the optical device and is capable of displaying an image with high image quality.

The invention can be implemented as the following application examples.

(1) An optical device according to this application example of the invention includes an optical unit that is configured as a plate and includes a light incidence face on which light is incident, a support unit that includes a recessed arrangement portion in which the optical unit is arranged, and a first shaft portion and a second shaft portion that support the support unit in a manner which enables the support unit to oscillate, in which a side face of the arrangement portion is separated from the optical unit between the optical unit and the first shaft portion and between the optical unit and the second shaft portion.

With this configuration, the rigidities of the first shaft portion and the second shaft portion can be approximately the same, and the optical unit can oscillate stably. Therefore, an optical device that is excellent for stabilizing the optical path can be provided.

(2) In the optical device according to the application example of the invention, it is preferable that an adhesive is arranged at the separated part.

With this configuration, the rigidities of the first shaft portion and the second shaft portion can be approximately the same because the side face of the arrangement portion faces the optical unit through the adhesive between the optical unit and the first shaft portion and between the optical unit and the second shaft portion. Therefore, the optical unit can oscillate more stably, and an optical device that is excellent for stabilizing the optical path can be provided.

(3) In the optical device according to the application example of the invention, it is preferable that the support unit further includes a notch portion between the optical unit and the first shaft portion, and an inner face of the notch portion constitutes a part of the side face of the arrangement portion.

With this configuration, the side face of the arrangement portion can be more securely separated from the optical unit between the optical unit and the first shaft portion and between the optical unit and the second shaft portion, and the rigidities of the first shaft portion and the second shaft portion can be approximately the same. Therefore, the optical unit can oscillate more stably, and an optical device that is excellent for stabilizing the optical path can be provided.

(4) In the optical device according to the application example of the invention, it is preferable that an adhesive is arranged in the notch portion.

With this configuration, the side face of the arrangement portion can face the optical unit through the adhesive between the optical unit and the first shaft portion and between the optical unit and the second shaft portion, and the rigidities of the first shaft portion and the second shaft portion can be approximately the same. Therefore, the optical unit can oscillate more stably, and an optical device that is excellent for stabilizing the optical path can be provided.

(5) In the optical device according to the application example of the invention, it is preferable that the planar shape of the arrangement portion is larger than the planar shape of the optical unit.

With this configuration, the side face of the arrangement portion can be more securely separated from the optical unit between the optical unit and the first shaft portion and between the optical unit and the second shaft portion, and thus the rigidities of the first shaft portion and the second shaft portion can be approximately the same.

(6) In the optical device according to the application example of the invention, it is preferable that the side face of the arrangement portion includes an abutting portion on which a side face of the optical unit abuts.

With this configuration, the optical unit can be arranged in the arrangement portion as butting against the abutting portion, and the optical unit can be more securely arranged.

(7) In the optical device according to the application example of the invention, it is preferable that the optical unit is positioned in the arrangement portion by abutting on the abutting portion.

With this configuration, the optical unit can be more securely arranged.

(8) In the optical device according to the application example of the invention, it is preferable that the support unit is configured of a material that has a smaller modulus of elasticity than a material which constitutes the optical unit.

With this configuration, a stress that is exerted on the optical unit when the optical unit oscillates to change the attitude can be suppressed to a smaller extent, and unnecessary vibrations that occur in the optical unit according to the stress distribution can be suppressed to a smaller extent.

(9) In the optical device according to the application example of the invention, it is preferable that the support unit is configured of a material that includes resin as a main component.

With this configuration, the elasticity of the support unit can be sufficiently smaller than the modulus of elasticity of the optical unit, a stress that is exerted on the optical unit when the optical unit oscillates to change the attitude can be suppressed to a smaller extent, and unnecessary vibrations that occur in the optical unit according to the stress distribution can be suppressed to a smaller extent.

(10) In the optical device according to the application example of the invention, it is preferable that the optical unit transmits light.

With this configuration, the direction and the extent of deflection of transmitted light can be controlled by changing the attitude of the optical unit so as to have an intended angle of incidence of light that is incident on the optical unit.

(11) In the optical device according to the application example of the invention, it is preferable that the optical unit reflects light.

With this configuration, the direction and the extent of deflection of reflective light can be controlled by changing the attitude of the optical unit so as to have an intended angle of incidence of light that is reflected by the optical unit.

(12) An image display apparatus according to this application example of the invention includes the optical device according to the application example of the invention.

With this configuration, the optical unit can stably oscillate in the optical device. As a result, an image display apparatus that can display an image with high image quality can be provided.

(13) In the image display apparatus according to the application example of the invention, it is preferable that the image display apparatus is configured in a manner in which the optical device spatially modulating light shifts the position of a pixel that is displayed by irradiation with the light.

With this configuration, an image display apparatus is obtained in which the stability of the optical path in the optical device is increased, the resolution of a displayed image, for example, is increased, and degradation of the accuracy of the image due to unnecessary vibrations in the optical device is suppressed.

(14) In the image display apparatus according to the application example of the invention, it is preferable that the optical device spatially modulating light forms an image by scanning the light.

With this configuration, the scanning position of light that is scanned by the optical device can be precisely controlled because the stability of the optical path is high in the optical device. Therefore, an image display apparatus having an excellent drawing characteristic is obtained.

BRIEF DESCRIPTION OF THE DRAWINGS

The invention will be described with reference to the accompanying drawings, wherein like numbers reference like elements.

FIGS. 7A and 7B are diagrams illustrating a state of operation of the optical path deflecting element illustrated in FIG. 5A and FIG. 6.

DESCRIPTION OF EXEMPLARY EMBODIMENTS

Hereinafter, an optical device and an image display apparatus according to the invention will be described in detail on the basis of each embodiment illustrated in the appended drawings.

First Embodiment

A description will be first provided for an optical path deflecting element to which a first embodiment of the optical device according to the invention is applied and a projector to which a first embodiment of the image display apparatus according to the invention is applied.

Figure 1:
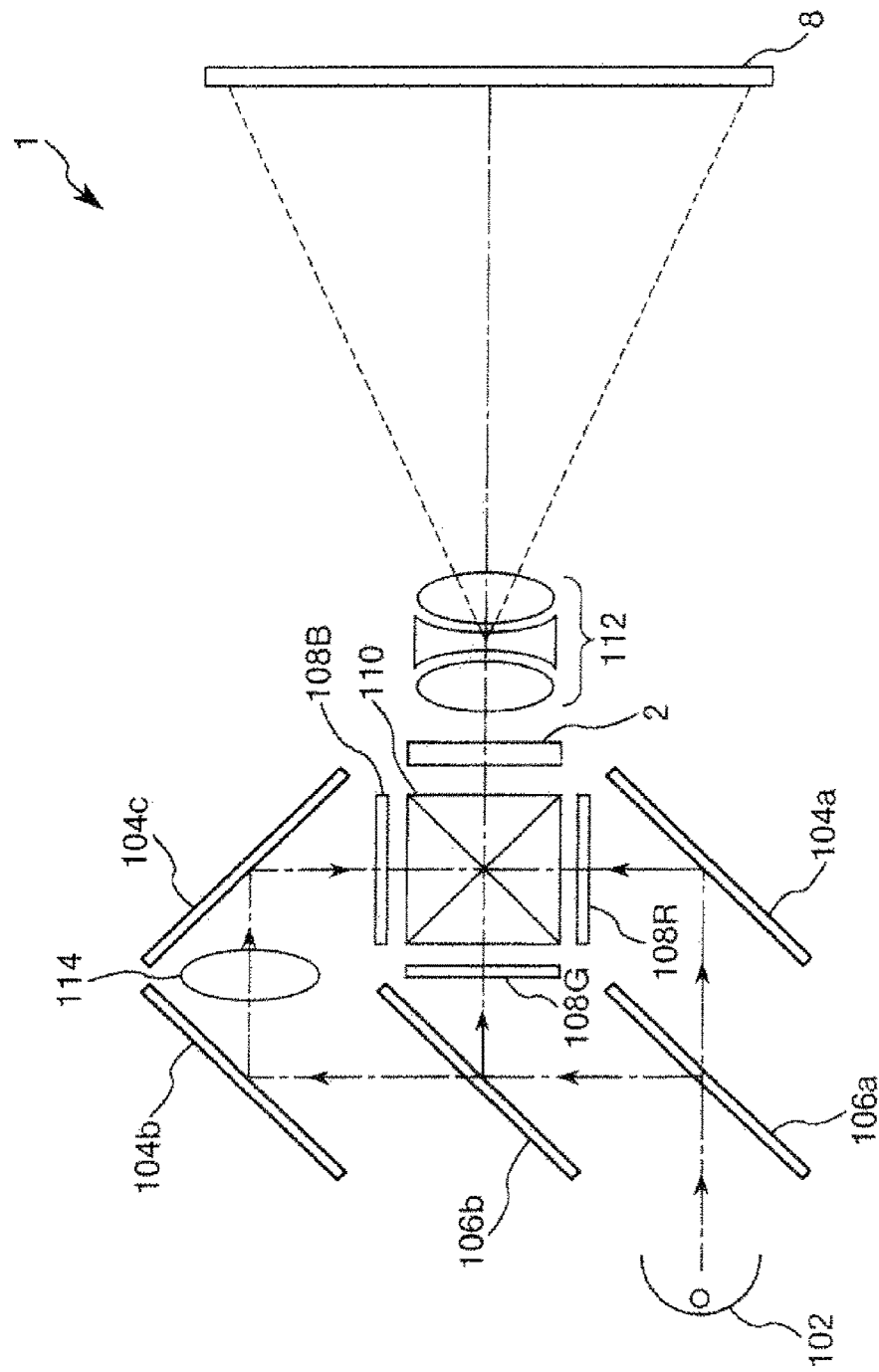
FIG. 1 is a diagram illustrating an optical configuration of a projector to which a first embodiment of an image display apparatus according to the invention is applied.
Figure 2:
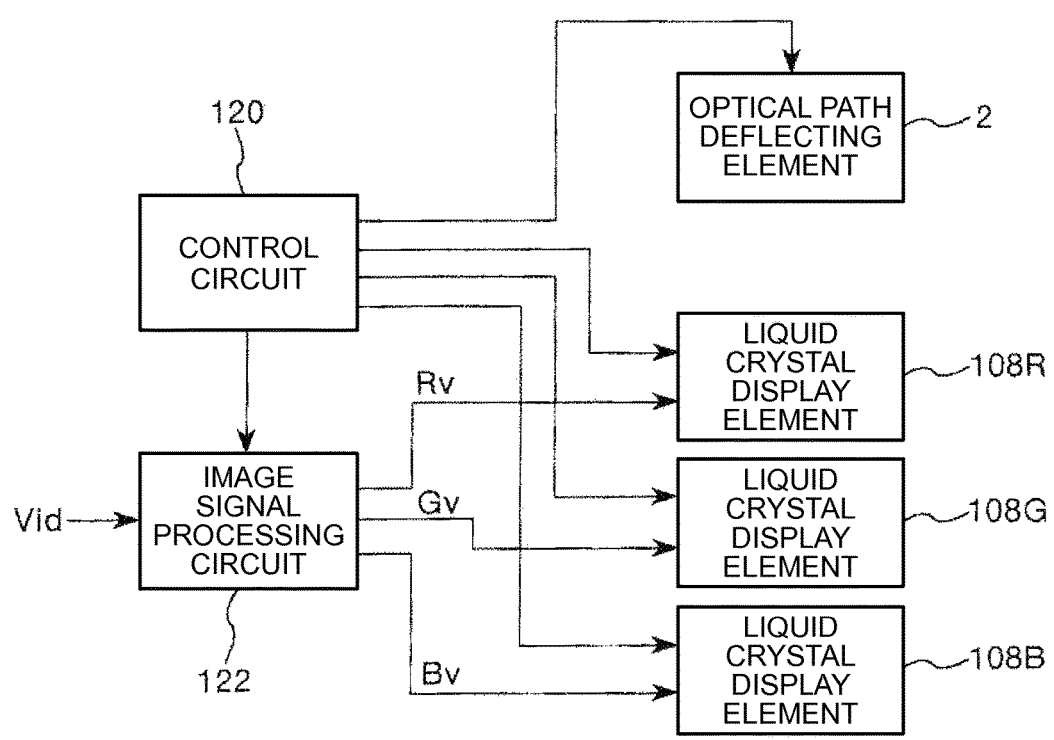
FIG. 2 is a block diagram illustrating an electrical configuration of the projector illustrated in FIG. 1.
Figure 3:
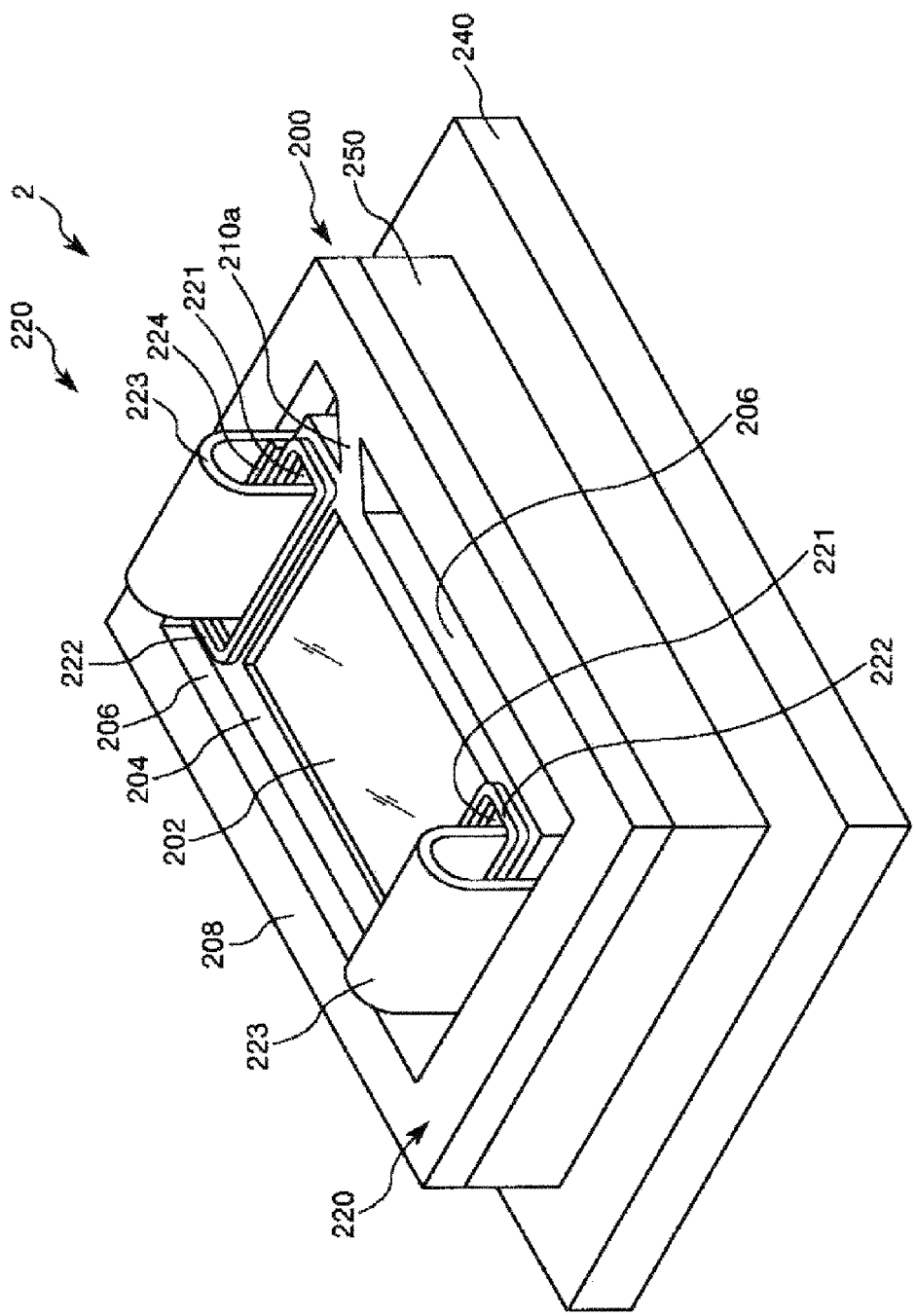
FIG. 3 is a perspective view illustrating a configuration of an optical path deflecting element (first embodiment of an optical device according to the invention) illustrated in FIG. 1.
Figure 4:
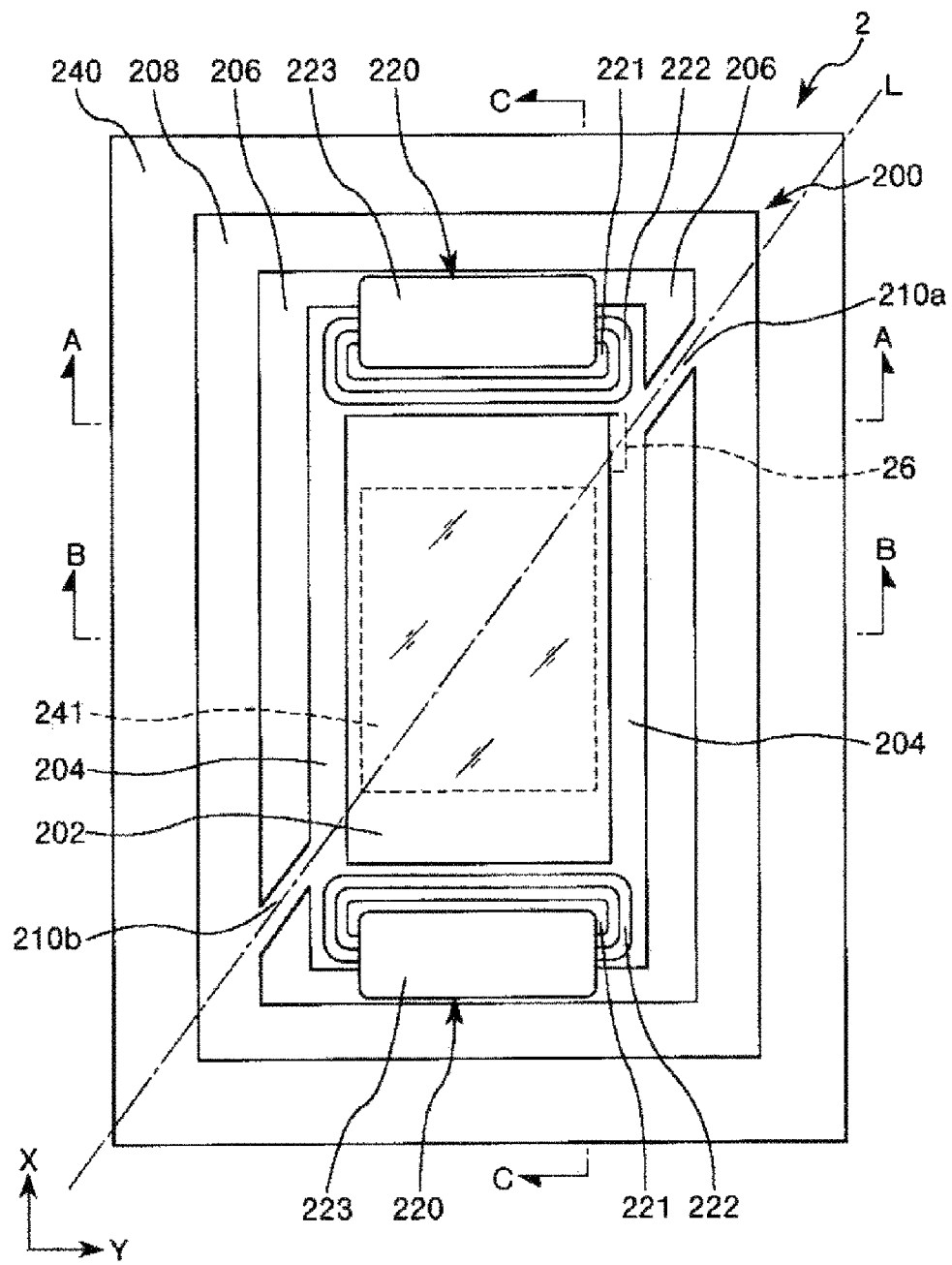
FIG. 4 is a plan view of the optical path deflecting element illustrated in FIG. 3.

FIG. 1 is a diagram illustrating an optical configuration of the projector to which the first embodiment of the image display apparatus according to the invention is applied. FIG. 2 is a block diagram illustrating an electrical configuration of the projector illustrated in FIG. 1. FIG. 3 is a perspective view illustrating a configuration of the optical path deflecting element (first embodiment of the optical device according to the invention) illustrated in FIG. 1. FIG. 4 is a plan view of the optical path deflecting element illustrated in FIG.

Figure 5A:
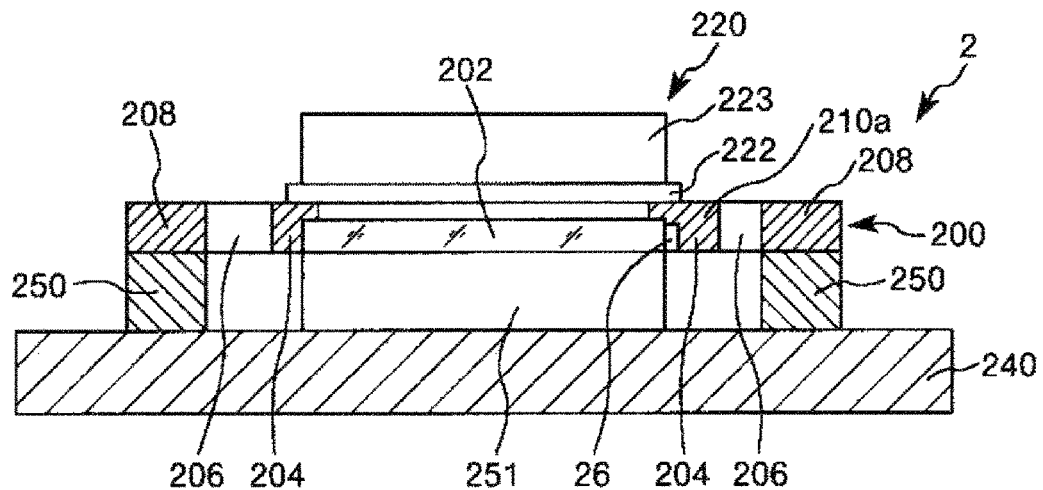
FIG. 5A is a cross-sectional view taken along a line A-A in FIG. 4.
Figure 5B:
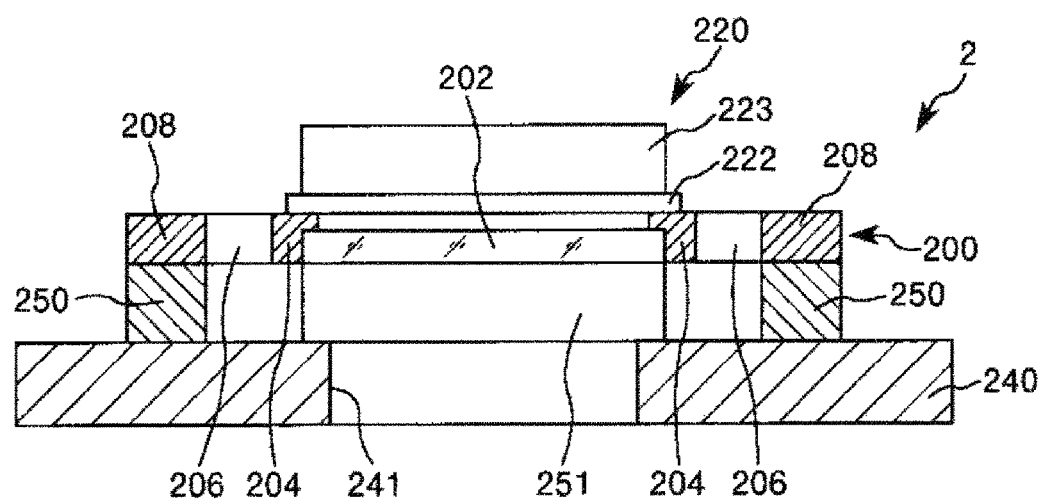
FIG. 5B is a cross-sectional view taken along a line B-B in FIG. 4.
Figure 6:
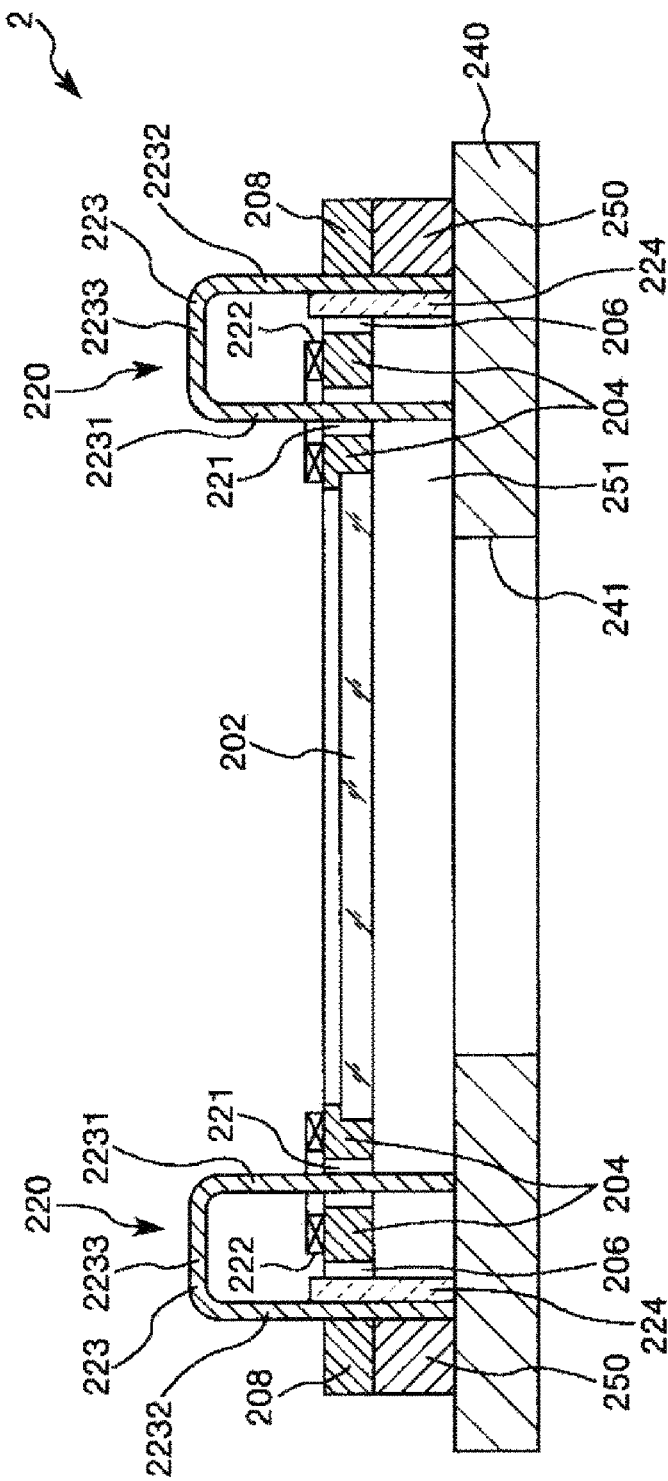
FIG. 6 is a cross-sectional view taken along a line C-C in FIG. 4.
Figure 8:
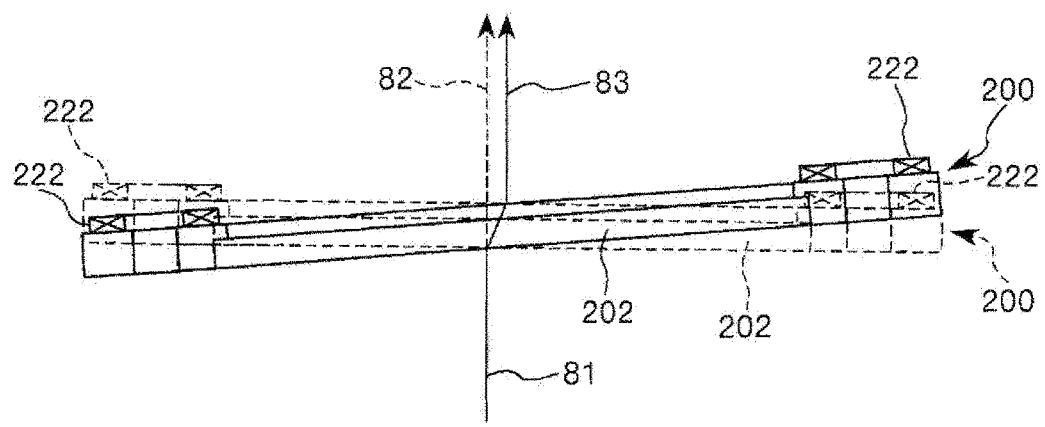
FIG. 8 is a diagram for describing a light deflection principle of the optical path deflecting element illustrated in FIGS. 7A and 7B.
Figure 9:
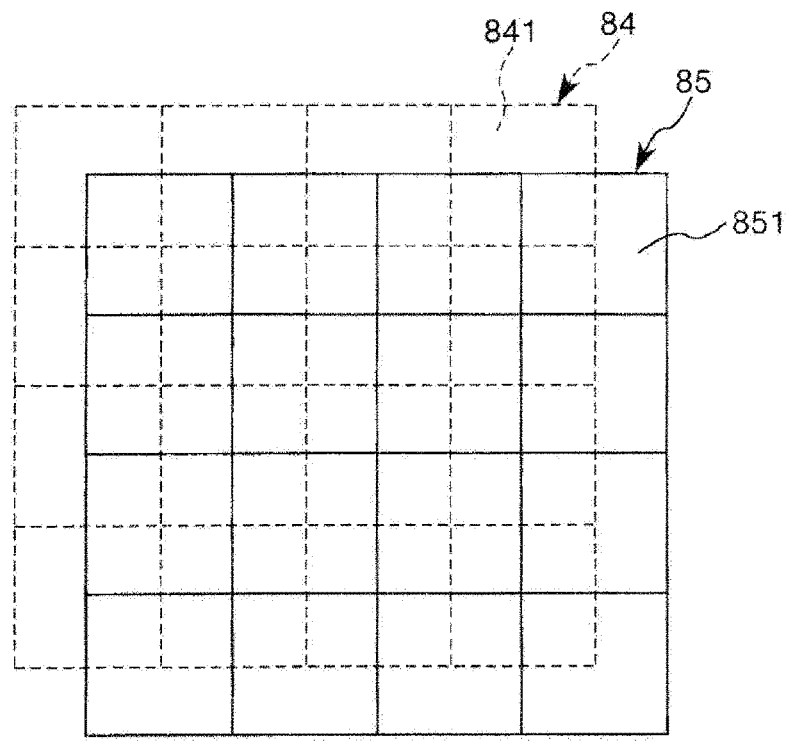
FIG. 9 is a diagram for describing the light deflection principle of the optical path deflecting element illustrated in FIGS. 7A and 7B.
Figure 10:
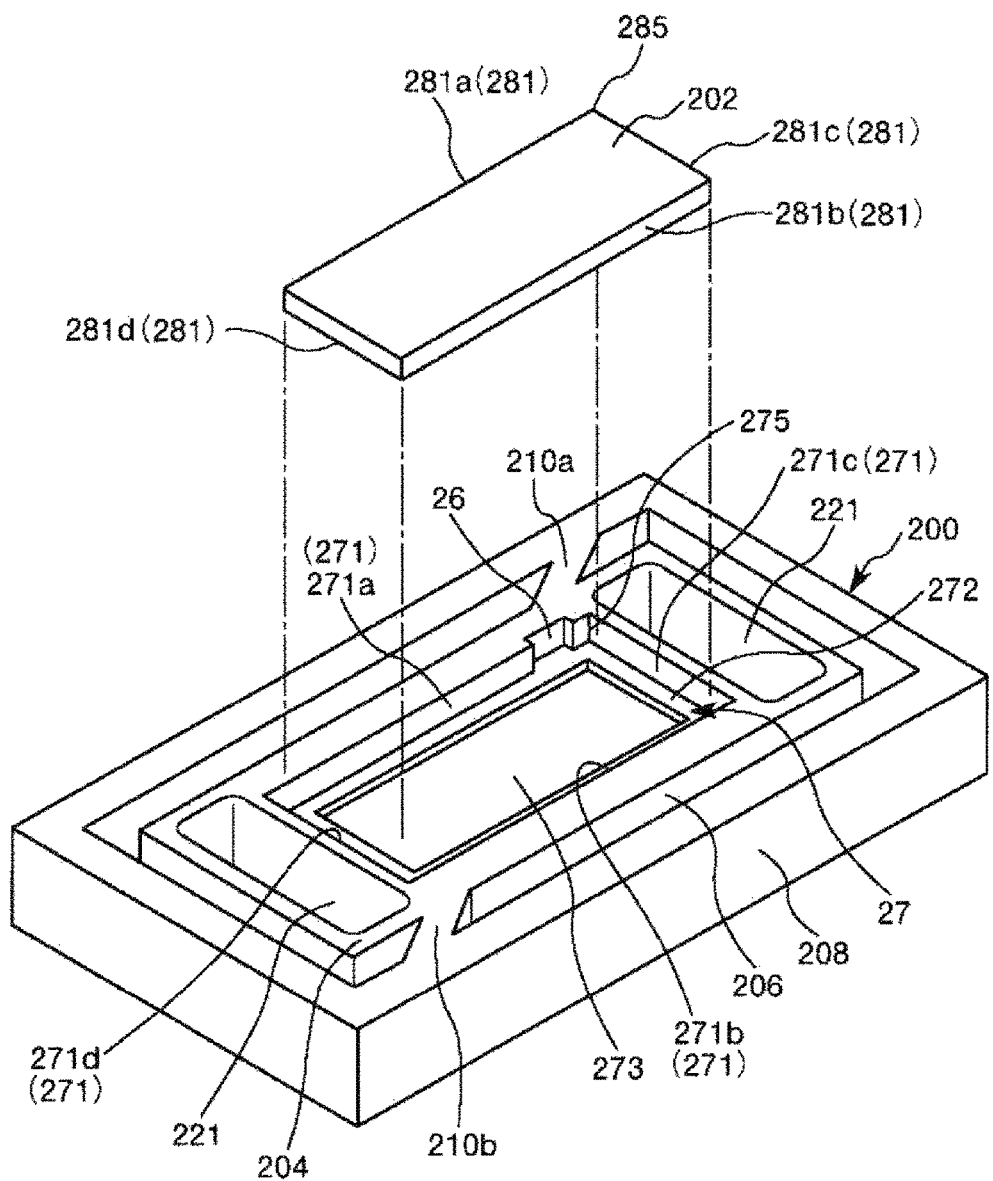
FIG. 10 is an exploded perspective view of a support unit and an optical unit illustrated in FIG. 3 when viewed from the rear face side.
Figure 11:
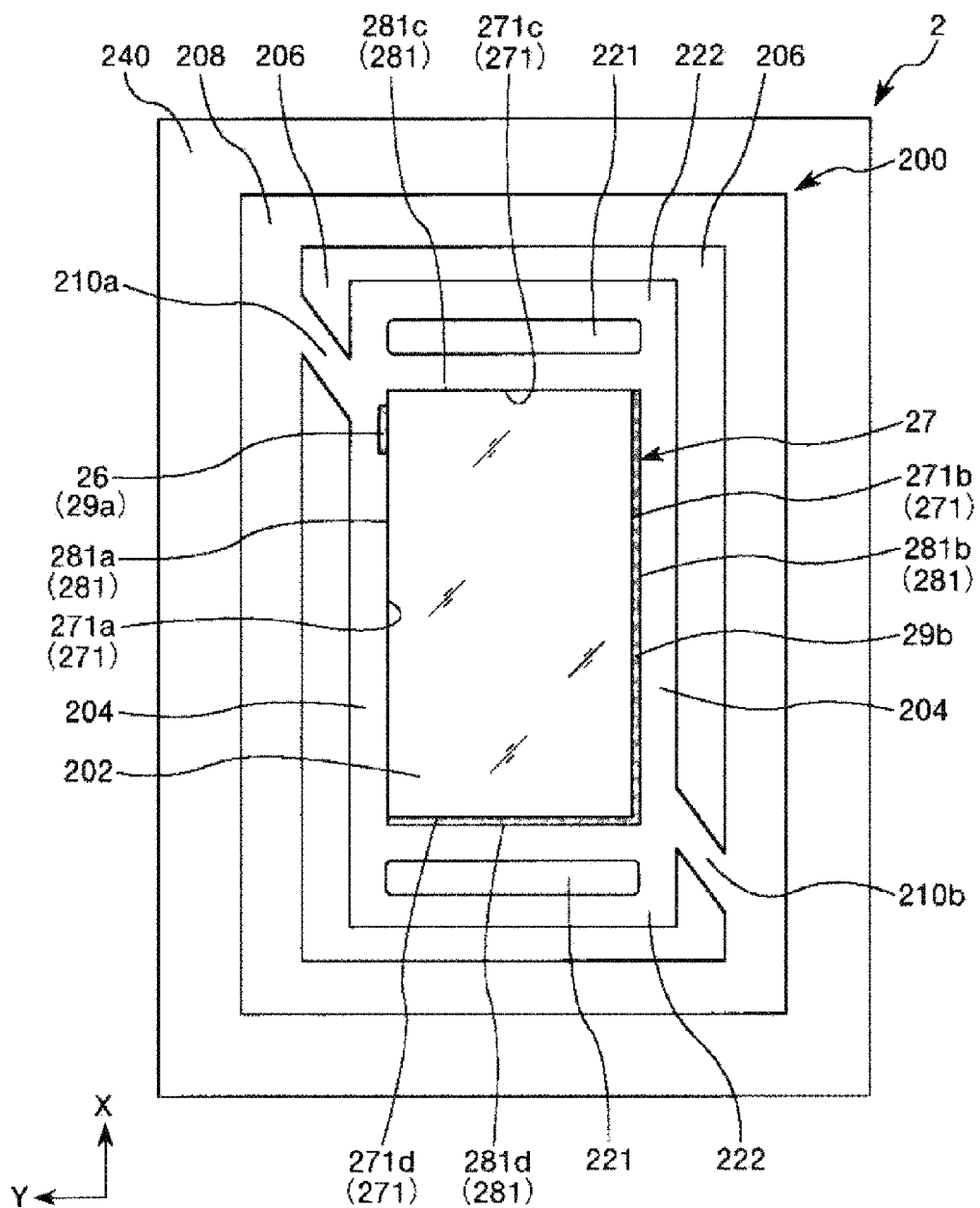
FIG. 11 is a plan view of the optical path deflecting element illustrated in FIG. 3 when viewed from the rear face side.

3. FIG. 5A is a cross-sectional view taken along a line A-A in FIG. 4. FIG. 5B is a cross-sectional view taken along a line B-B in FIG. 4. FIG. 6 is a cross-sectional view taken along a line C-C in FIG. 4. FIGS. 7A and 7B are diagrams illustrating a state of operation of the optical path deflecting element illustrated in FIG. 5A and FIG. 6. FIG. 8 is a diagram for describing a light deflection principle of the optical path deflecting element illustrated in FIGS. 7A and 7B. FIG. 9 is a diagram for describing the light deflection principle of the optical path deflecting element illustrated in FIGS. 7A and 7B. FIG. 10 is an exploded perspective view of a support unit and an optical unit illustrated in FIG. 3 when viewed from the rear face side. FIG. 11 is a plan view of the optical path deflecting element illustrated in FIG. 3 when viewed from the rear face side.

In the present specification, the upper part of FIGS. 5A to 8 is described as "up" and the lower part as "down" for convenience of description.

A projector 1 illustrated in FIG. 1 is a projection type projector that enlarges and projects an image displayed on a liquid crystal display element.

The projector 1 according to the present embodiment, as illustrated in FIG. 1, is provided with a light source 102, three mirrors 104a, 104b, and 104c, two dichroic mirrors 106a and 106b, three liquid crystal display elements 108R, 108G, and 108B, a dichroic prism 110, an optical path deflecting element 2, a projective lens system 112, and a relay lens 114. Configurations of each unit will be described in detail hereinafter.

A description will be first provided for an optical configuration of the projector 1.

Examples of the light source 102 include a halogen lamp, a mercury vapour lamp, and a light-emitting diode (LED). The light source 102 used herein emits white light.

Each of the three mirrors 104a, 104b, and 104c has a function of changing the optical path in the projector 1 by reflection.

Meanwhile, each of the two dichroic mirrors 106a and 106b has a function of separating white light emitted from the light source 102 into three primary colors of red (R), green (G), and blue (B) and guiding each separated light to the different liquid crystal display elements 108R, 108G, and 108B.

The dichroic mirror 106a, for example, has a function of transmitting light in the R wavelength region and reflecting light in the G and B wavelength regions among white light rays. The dichroic mirror 106b has a function of transmitting light in the B wavelength region and reflecting light in the G wavelength region among light rays in the G and B wavelength regions that is reflected by the dichroic mirror 106a.

The optical path length of light in the B wavelength region is greater than the optical path length of other light because of reflection and the like by the dichroic mirrors 106a and 106b. Therefore, disposing the relay lens 114 on the optical path of light in the B wavelength region corrects the difference in the optical path length.

Each of the liquid crystal display elements 108R, 108G, and 108B is used as a spatial light modulator. The liquid crystal display elements 108R, 108G, and 108B are transmissive spatial light modulators that respectively correspond to the primary colors of R, G, and B. Each of the liquid crystal display elements 108R, 108G, and 108B is provided with pixels that are arranged into, for example, a matrix of vertically 1080 rows and horizontally 1920 columns. The intensity of transmitted light with respect to incident light is adjusted at each pixel. The distribution of light intensity of all pixels is cooperatively controlled in each of the liquid crystal display elements 108R, 108G, and 108B.

Scan lines and data lines are disposed to correspond to each pixel in the liquid crystal display elements 108R, 108G, and 108B (not illustrated). Furthermore, a liquid crystal is arranged between a pixel electrode and a common electrode that is arranged to face the pixel electrode (not illustrated). The liquid crystal corresponds to the position where the scan line and the data line intersect.

An unillustrated polarization plate, in addition, is disposed in each of the liquid crystal display elements 108R, 108G, and 108B. When the voltage of the data line is applied to the pixel electrode by the selected scan line, molecules of the liquid crystal are oriented, and transmitted light is polarized. By appropriately setting the polarization by molecules of the liquid crystal and the arrangement of the polarization plate, the intensity of transmitted light can be adjusted for each pixel.

Light that is spatially modulated by each of the liquid crystal display elements 108R, 108G, and 108B is incident on the dichroic prism 110 from three directions. Light in the R and B wavelength regions among incident light rays is refracted at 90° and is emitted from the dichroic prism 110. Meanwhile, light in the G wavelength region travels straight and is emitted from the dichroic prism 110. As a result, light emitted from the dichroic prism 110 includes a full color image in which images in each primary color of R, G, and B are composited, and the light is incident on the optical path deflecting element 2.

Although a detailed description will be provided later, the optical path deflecting element 2 includes a glass plate 202 (optical unit) and is capable of appropriately selecting whether to deflect (shift) light that is incident on the glass plate 202.

The deflected light is incident on the projective lens system 112.

The projective lens system 112 is a compound lens system in which multiple lenses are combined. The projective lens system 112 enlarges the composited image and projects the image onto a screen 8.

Next, a description will be provided for an electrical configuration of the projector 1.

The projector 1 according to the present embodiment, as illustrated in FIG. 2, is provided with a control circuit 120 and an image signal processing circuit 122 in addition to the above optical path deflecting element 2 and each of the liquid crystal display elements 108R, 108G, and 108B.

The control circuit 120, for example, controls writing of a data signal into the liquid crystal display elements 108R, 108G, and 108B, optical path deflection in the optical path deflecting element 2, and generation of a data signal in the image signal processing circuit 122.

The image signal processing circuit 122 has a function of separating an image signal Vid supplied from an unillustrated external device into components in each of three primary colors of red (R), green (G), and blue (B) and converting the separated components into data signals Rv, Gv, and Bv that are appropriate for operation of each of the liquid crystal display elements 108R, 108G, and 108B. The converted data signals Rv, Gv, and Bv are respectively supplied to the liquid crystal display elements 108R, 108G, and 108B, and the liquid crystal display elements 108R, 108G, and 108B operate on the basis of the data signals Rv, Gv, and Bv.

Hereinafter, the optical path deflecting element 2 will be described in detail.

Optical Path Deflecting Element

As illustrated in FIG. 3 and FIG. 4, the optical path deflecting element (optical device) 2 includes a base 240, a functional unit 200, and a drive unit 220. The functional unit 200 and the drive unit 220 are disposed on the base 240. The functional unit 200 is arranged on the base 240 with a spacer 250 interposed therebetween.

The functional unit 200 is provided with the glass plate (optical unit) 202 that deflects light, a support unit 204 that surrounds side faces of the glass plate 202, a frame-shaped holding member 208 that is separated from the support unit 204 and surrounds side faces of the support unit 204, and a first shaft portion 210a and a second shaft portion 210b that are disposed to connect the support unit 204 and the holding member 208.

Hereinafter, each unit will be described in order.

Base

The base 240 has a shape of a flat plate. The base 240 supports the functional unit 200 and secures the mechanical strength of the optical path deflecting element 2.

The base 240 has a rectangular shape greater than the functional unit 200 in a planar view. The periphery of the base 240 is configured as protruding from the periphery of the functional unit 200.

A through hole 221 that passes through the base 240 in the thickness direction is formed in the base 240 as illustrated in FIG. 4. The through hole 221 corresponds to the position of the glass plate 202. Disposing the through hole 221 enables light that is incident on the glass plate 202 to be transmitted through the optical path deflecting element 2.

The planar shape of the base 240 is quadrangular. However, the planar shape of the base 240 is not particularly limited and may be, for example, polygonal, circular, or elliptic provided that the shape can support the functional unit 200.

Examples of the material of the base 240 include inorganic materials such as glass, silicone, metal, and ceramic and organic materials such as resin.

Spacer

The spacer 250 is disposed on the base 240 as illustrated in FIG. 3.

The spacer 250 has a shape of a frame and is interposed between the functional unit 200 and the base 240. The spacer 250 has a smaller planar shape than the base 240 and is included in the base 240 in a planar view.

A space 251 is formed by inner walls of the spacer 250, the top face of the base 240, and the bottom face of the functional unit 200 as illustrated in FIGS. 5A, 5B, and 6. The space 251 functions as a space for allowing oscillation of the support unit 204 and the glass plate 202.

While the overall shape of the spacer 250 is a rectangular frame as described above in the present embodiment, the overall shape of the spacer 250 is not particularly limited provided that the shape can form the space for allowing oscillation of the glass plate 202.

Examples of the material of the spacer 250 include inorganic materials such as glass, silicone, metal, and ceramic and organic materials such as resin.

The spacer 250 may be integrated with the base 240 or may be omitted depending on the configuration of the base 240. Furthermore, the spacer 250 may be integrated with the functional unit 200.

Functional Unit

The functional unit 200 is supported by the base 240 as illustrated in FIG. 3 with the spacer 250 interposed therebetween.

The functional unit 200, as described above, includes the holding member 208, the support unit 204, the first shaft portion 210a and the second shaft portion 210b, and the glass plate (optical unit) 202.

Hereinafter, each unit will be described in order.

Holding Member

The holding member 208, as illustrated in FIG. 3 and FIG. 6, is disposed on the spacer 250 and has a shape of a rectangular frame, the shape corresponding to the spacer 250. While the holding member 208 has a shape of a rectangular frame in the present embodiment, the shape of the holding member 208 is not limited to a rectangular frame and may be any shape provided that the shape can hold the first shaft portion 210a and the second shaft portion 210b in the base 240. The holding member 208 may be integrated with the spacer 250.

Support Unit

The support unit 204 is disposed inside the holding member 208 as illustrated in FIG. 3 and FIG. 4 with a gap 206 interposed therebetween.

The support unit 204 is rectangular in a planar view and includes an arrangement portion 27 where the glass plate 202 is arranged and two through holes 221 that pass through the support unit 204 in the thickness direction.

The through hole 221 is a hole that is formed at a position corresponding to the short edge of the support unit 204 and has an elongated opening. The through hole 221 is formed to have a long axis that is parallel to the short edge of the support unit 204. While the opening of the through hole 221 is rectangular (oblong) in FIG. 4, the shape of the opening is not particularly limited. A core 223 of the later-described drive unit 220 is inserted into the through hole 221.

The specific configuration of the support unit 204 will be described in detail later.

First Shaft Portion and Second Shaft Portion

The support unit 204, as illustrated in FIG. 3 and FIG. 4, is connected to the holding member 208 by two (a pair) of the first shaft portion 210a and the second shaft portion 210b.

Each of the first shaft portion 210a and the second shaft portion 210b is disposed to bridge the gap 206 and is disposed at a position corresponding to the different long edge of the two long edges of the support unit 204. Both of the axis lines of the first shaft portion 210a and the second shaft portion 210b are positioned in an inclined manner with respect to the X axis and the Y axis illustrated in FIG. 4 and are arranged to be positioned on the same line. Therefore, a line L along which the axis lines of the first shaft portion 210a and the second shaft portion 210b pass is inclined with respect to the X axis and the Y axis of FIG. 4. The line L is the axis of oscillation of the glass plate 202. Thus, the support unit 204 (and the glass plate 202) that is supported in the holding member 208 by only the two of the first shaft portion 210a and the second shaft portion 210b can oscillate around the line L as an axis of oscillation. The support unit 204 oscillating around the first shaft portion 210a and the second shaft portion 210b as an axis of oscillation changes the attitude of the glass plate 202 that is supported in the support unit 204.

The first shaft portion 210a and the second shaft portion 210b are preferably arranged at positions that satisfy a point symmetric relationship with respect to the center of the glass plate 202 in a planar view. Accordingly, the balance of oscillation is favorable, and the glass plate 202 can oscillate stably. Accordingly, image deflection behavior is stabilized, and thus a high-resolution image can be stably projected.

The above holding member 208, the support unit 204, and the shaft portions 210a and 210b may be formed as individual bodies that are bonded together but are preferably integrated with each other. Accordingly, the shock resistance and the long-term durability of the boundary portion between the holding member 208 and the shaft portions 210a and 210b and the boundary portion between the support unit 204 and the shaft portions 210a and 210b can be increased.

Optical Unit

The glass plate 202, as illustrated in FIG. 3 and FIG. 4, is a light-transmissive plate and has a rectangular (oblong) planar shape. The glass plate 202 is arranged in the arrangement portion 27 of the support unit 204.

Light that is incident on the glass plate 202 is either transmitted straight through the glass plate 202 or is refracted and transmitted (spatially modulated) through the glass plate 202 depending on the angle of incidence of the light. Therefore, the direction and the extent of deflection of transmitted light can be controlled by changing the attitude of the glass plate 202 through oscillation of the glass plate 202 so as to have an intended angle of incidence. Accordingly, the full color image composited by the dichroic prism 110 can be deflected in an arbitrary direction.

Examples of the material of the glass plate 202 include various glass materials such as water-white glass, borosilicate glass, and quartz glass. While the glass plate 202 is used as the optical unit in the present embodiment, the optical unit is not particularly limited provided that the optical unit is configured of a light-transmissive material. The optical unit may be configured of, for example, various crystalline materials such as crystal and sapphire or various resin materials such as polycarbonate-based resin and acrylic-based resin. However, the optical unit is preferably configured of various glass materials having flatness (high flatness). When the optical unit is configured of various glass materials, the modulus of elasticity and the rigidity of the optical unit can be increased, and variations in deflection of light (image) in the optical unit can be suppressed.

The planar size of the glass plate 202 is appropriately set so that light rays emitted from the dichroic prism 110 can be transmitted through the glass plate 202. In FIG. 4, a direction that is parallel to the long axis of the glass plate 202 is set as an X-axis direction, and a direction that is parallel to the short axis is set as a Y-axis direction.

A pixel group that constitutes the image deflected by the glass plate 202 which is configured as above is typically an aggregate of pixels in which arrays of pixels that are arranged parallel to the X axis are lined up along the Y axis. That is, the pixel group is arranged into a matrix on the XY plane. Although the number of pixels is not particularly limited, for example, 1920 arrays are configured in the X-axis direction, and 1080 arrays are configured in the Y-axis direction.

The image (pixel group) in which pixels are arranged into a matrix is deflected when being transmitted through the glass plate 202. However, when the axis of oscillation of the glass plate 202 is inclined with respect to both of the X axis and the Y axis as described above, the direction of deflection of the image is also along an inclined direction with respect to both of the X axis and the Y axis. Accordingly, for example, when an image projected onto the screen 8 is rectangular, the image can be shifted in an inclined manner with respect to the both vertical and horizontal directions. As a result, each of the vertical and horizontal resolution of the image can be increased in a simulated manner, and the resolution of the projected image can be increased.

Drive Unit

The optical path deflecting element 2, as illustrated in FIG. 3, is provided with a pair (two) of drive units 220 that are driven to oscillate the glass plate 202. The driving force generated by the drive unit 220 causes the glass plate 202 to oscillate.

The drive unit 220 is provided with a ring-shaped coil 222 that is mounted on the support unit 204 to surround the through hole 221 of the support unit 204, the core 223 that is mounted on the top face of the base 240, and a magnet 224 that is disposed adjacent to the core 223.

The coil 222 is bonded to the top face of the support unit 204. The coil 222 has a shape of a ring and is configured in a manner in which the inside of the ring and the opening of the through hole 221 match substantially in the present embodiment.

The coil 222 is connected to an unillustrated voltage applying unit. The voltage applying unit applies a voltage to the coil 222.

The core 223 is a magnetic core that has a shape of a partially bent plate. The core 223, as illustrated in FIG. 6, is divided into two leg portions 2231 and 2232 that are erected on the top face of the base 240 and a beam portion 2233 that connects the end portions of the two leg portions 2231 and 2232. Among these, the leg portion 2231 is arranged to be inserted into the through hole 221, and the leg portion 2232 is arranged inside the frame-shaped holding member 208.

The leg portion 2231 is disposed in a manner in which the outer face of the leg portion 2231 is not in contact with the inner face of the through hole 221. Particularly, the leg portion 2231 is preferably inserted into the through hole 221 in a manner in which a gap exists between the through hole 221 and the core 223 at all times during oscillation of the glass plate 202.

The magnet 224 is arranged adjacent to the leg portion 2232. The magnet 224 is disposed between the leg portion 2232 (core 223) and the support unit 204.

The core 223 is configured of soft-magnetic materials such as pure iron, soft ferrite, and permalloy.

The magnet 224 is configured by, for example, a permanent magnet. Arranging the magnet 224 adjacent to the leg portion 2232 forms a magnetic path across the coil 222 and generates the Lorentz force (driving force) between the coil 222 and a magnetic field that is caused when a voltage is applied to the coil 222. Examples of the permanent magnet include a neodymium magnet, a ferrite magnet, a samarium cobalt magnet, and an alnico magnet.

In the drive unit 220 configured as above, when a voltage is applied to the coil 222, a magnetic force that is driven toward the upper part or the lower part of FIG. 6 is generated in the coil 222 depending on the direction of the applied voltage and the direction of the magnetic field that is generated from the magnet 224. The magnetic force allows the above support unit 204 and the glass plate 202 to be driven upward or downward.

The drive unit 220 that uses the above magnetic force may be replaced with another unit that drives the support unit 204 and the glass plate 202. Examples of another unit include a piezoelectric drive unit.

The position and the number of the drive unit 220 are also not limited to the illustrated one.

Next, a description will be provided for operation of the optical path deflecting element 2.

When a voltage is not applied to the coil 222, the glass plate 202 does not oscillate in the optical path deflecting element 2 as illustrated in FIGS. 5A, 5B, and 6. Thus, as illustrated by a broken line in FIG. 8, light 81 that is incident on the glass plate 202 is emitted as light 82 that travels straight without being refracted because the angle of incidence of the light 81 is a right angle.

Meanwhile, as illustrated in FIGS. 7A and 7B, when a predetermined voltage is applied to the coil 222, the glass plate 202 is inclined in a manner in which one end of the glass plate 202 approaches the base 240, and the other end recedes from the base 240. That is, the direction of the voltage applied to each coil 222 is set so that each drive unit 220 exhibits this behavior. Accordingly, the glass plate 202 is inclined as illustrated by a solid line in FIG. 8. The light 81 that is incident on the glass plate 202 in this state is refracted when being transmitted through the glass plate 202 and is emitted as light 83. Since the light 83 is spatially deviated from the light 82, the image that is formed by the light 83 is projected onto the screen 8 as deviated from the image that is formed by the light 82.

The optical path deflecting element 2, as described above, is provided with two drive units 220, and each drive unit 220 is arranged to correspond to the short edge of the support unit 204. Therefore, driving the two drive units 220 in different directions allows the support unit 204 and the glass plate 202 to oscillate smoothly. That is, when one drive unit 220 drives the support unit 204 upward in a certain time slot, the other drive unit 220 may drive the support unit 204 downward. When one drive unit 220 drives the support unit 204 downward in another time slot, the other drive unit 220 may drive the support unit 204 upward. In still another time slot, the support unit 204 and the glass plate 202 may not oscillate by not applying a voltage to the coil 222. The behavior of the optical path deflecting element 2 can be controlled as intended by controlling the method of applying a voltage to the coil 222 by appropriately selecting from these time slots.

FIG. 9 illustrates an image 84 and an image 85 in which pixels are arranged into a matrix of vertically four rows and horizontally four columns. The image 84 is an aggregate of pixels 841 that is formed by the light 82 illustrated in FIG. 8. The image 85 is an aggregate of pixels 851 that is formed by the light 83 illustrated in FIG. 8.

FIG. 9 illustrates an example in which the image 84 is shifted to the image 85 by oscillation of the glass plate 202. The amount of shifting at this time is half the pitch of the pixels 841. As a result, the number of pixels in the image 85 that is projected onto the screen 8 is double the number of pixels in the image 84, and the resolution of the image is increased.

The image 85, as described above, is shifted in an inclined manner with respect to the direction of arrangement of the pixels 841. Thus, the number of pixels in the image 85 is actually double the number of pixels in the image 84 vertically and horizontally.

The amount of shifting of the image by the optical path deflecting element 2 is not limited to half the pitch of the pixels and may be, for example, a quarter or one eighth of the pitch.

While the configuration and the operation of the optical path deflecting element 2 are briefly described so far, the optical path deflecting element 2 is featured by the configuration of the support unit 204 that accommodates the glass plate 202. Hereinafter, this feature will be described in detail.

FIG. 10 is an exploded perspective view illustrating the rear face side of the optical path deflecting element 2, and FIG. 11 is a plan view illustrating the rear face side of the optical path deflecting element 2. In FIG. 10 and FIG. 11, the base 240, the spacer 250, and the drive unit 220 in the optical path deflecting element 2 are not illustrated.

The support unit 204, as described above, includes the arrangement portion 27 where the glass plate 202 is arranged.

The arrangement portion 27, as illustrated in FIG. 10 and FIG. 11, has a shape of a recess that is recessed in the thickness direction of the support unit 204. The arrangement portion 27 includes a through hole 273 that passes through the central portion other than the periphery portion of the arrangement portion 27 in the thickness direction of the support unit 204.

The arrangement portion 27 includes a bottom portion 272 and a side face portion (side face) 271 that is erected on the bottom portion 272. The side face portion 271 extends in the longitudinal direction of the support unit 204 and includes a side face 271a and a side face 271b that are arranged to face each other and a side face 271c and a side face 271d that connect both ends of the side face 271a and the side face 271b.

The planar shape of the arrangement portion 27 conforms to the planar shape of the glass plate 202 and is slightly larger than the glass plate 202. The planar shape of the through hole 273 is formed slightly smaller than the planar shape of the glass plate 202 so that the glass plate 202 is not separated from the arrangement portion 27.

A recess portion (notch portion) 26 is disposed between the first shaft portion 210a of the support unit 204 and the glass plate 202 as illustrated in FIG. 10. The recess portion 26 is positioned on the line L (axis of oscillation). The recess portion 26 is recessed outward from the side face 271a, and the inner faces of the recess portion 26 form a part of the side face (inside face of the support unit 204) 271a of the arrangement portion 27. That is, the side face 271a has a part in the side face 271a (or in the end portion of the side face 271a) that is recessed toward the outside of the support unit 204 from the other part.

While the planar shape of the recess portion 26 is rectangular (oblong) in the present embodiment, the planar shape of the recess portion 26 is not limited thereto. In addition, while the number of the recess portion 26 is one in the present embodiment, the number of the recess portion 26 is not limited to one and may be two or more.

The edge portion of the top face (the face on the lower side in FIG. 10) of the glass plate 202 that is arranged in the arrangement portion 27 abuts on the bottom portion 272 of the arrangement portion 27. Since the central portion of the top face of the glass plate 202 faces the through hole 273, light (image) can be transmitted through the facing area.

A part of a periphery face 281 of the glass plate 202 abuts on the side face 271 of the arrangement portion 27. Specifically, as illustrated in FIG. 11, a side face 281a of the glass plate 202 abuts on the side face 271a. In addition, a side face 281c of the glass plate 202 abuts on the side face 271c. Meanwhile, a side face 281b of the glass plate 202 is separated from the side face 271b. In addition, a side face 281d of the glass plate 202 is separated from the side face 271d.

Since the glass plate 202 is arranged in the arrangement portion 27 as above, the side face 281a of the glass plate 202 is separated from the side face 271a of the arrangement portion 27 because of the presence of the recess portion 26 in the vicinity of the first shaft portion 210a. The side face 281b of the glass plate 202 is also separated from the side face 271b of the arrangement portion 27 in the vicinity of the second shaft portion 210b as described above.

The recess portion 26 is filled (arranged) with an adhesive 29a. Similarly, the space (gap) between the glass plate 202 and the side faces 271b and 271d of the arrangement portion 27 is filled (arranged) with an adhesive 29b. The adhesives 29a and 29b fix the glass plate 202 to the support unit 204. Accordingly, oscillation of the support unit 204 around the first shaft portion 210a and the second shaft portion 210b as the axis of oscillation changes the attitude of the glass plate 202 that is supported (fixed) in the support unit 204.

The rigidity of the support unit 204 can be approximately the same in the vicinity of the first shaft portion 210a and in the vicinity of the second shaft portion 210b because the periphery face 281 of the glass plate 202 faces the side face portion 271 of the arrangement portion 27 through the adhesives 29a and 29b in the vicinity of the first shaft portion 210a and in the vicinity of the second shaft portion 210b. Therefore, the glass plate 202 can oscillate stably, and this can improve the stability of the optical path of light that is transmitted through the glass plate 202.

Examples of the adhesive include an epoxy-based adhesive, an acrylic-based adhesive, and a silicone-based adhesive.

In the arrangement of the glass plate 202 in the arrangement portion 27, first, the glass plate 202 is inserted into the arrangement portion 27, and one corner portion 285 of the glass plate 202 butts (abuts) against a corner portion 275 that is positioned on the first shaft portion 210a side of the arrangement portion 27. That is, the glass plate 202 is shifted in the arrangement portion 27 so that the side face 281a of the glass plate 202 and the side face 281c of the glass plate 202 respectively abuts on the side face 271a of the arrangement portion 27 and the side face 271c of the arrangement portion 27. Then, the recess portion 26 and the space (gap) between the glass plate 202 and the side faces 271b and 271d of the arrangement portion 27 are filled with the adhesives 29a and 29b. Accordingly, the glass plate 202 is arranged in the arrangement portion 27 as illustrated in FIG. 11. The adhesives 29a and 29b may be applied in advance before the glass plate 202 is inserted into the arrangement portion 27.

The glass plate 202 can be more securely positioned in the arrangement portion 27 by causing the corner portion 275 and the side faces 271a and 271c to function as an abutting portion where the glass plate 202 abuts on when the glass plate 202 is arranged in the arrangement portion 27.

While the present embodiment has the configuration in which the recess portion 26 and the space (gap) between the glass plate 202 and the side faces 271b and 271d of the arrangement portion 27 are filled with the adhesives 29a and 29b, an adhesive may be arranged on all faces of the side face portion 271 (and the bottom portion 272) of the arrangement portion 27. That is, all faces of the periphery face 281 of the glass plate 202 may abut on the side face portion 271 of the arrangement portion 27 with an adhesive interposed therebetween.

The recess portion 26 and the space (gap) between the glass plate 202 and the side faces 271b and 271d of the arrangement portion 27 may not be filled with the adhesives 29a and 29b. That is, the periphery face 281 of the glass plate 202 may face the side face portion 271 of the arrangement portion 27 through an air layer that is formed in the recess portion 26 and the gap between the glass plate 202 and the side faces 271b and 271d of the arrangement portion 27 in the vicinity of the first shaft portion 210a and the second shaft portion 210b. Even in this case, the rigidity of the support unit 204 can be approximately the same in the vicinity of the first shaft portion 210a and in the vicinity of the second shaft portion 210b, and this can improve the stability of the optical path of light that is transmitted through the glass plate 202.

While the planar shape of the glass plate 202 is slightly smaller than the planar shape of the arrangement portion 27 in the present embodiment, the planar shape of the glass plate 202 may be substantially the same as the planar shape of the arrangement portion 27. In this case, the same recess portion (notch portion) as the recess portion 26 may also be disposed in the vicinity of the second shaft portion 210b of the support unit 204.

The support unit 204 configured as above is preferably configured of a material that has a smaller modulus of elasticity than the material of the glass plate 202. Accordingly, a stress that is exerted on the glass plate 202 when the glass plate 202 oscillates to change the attitude can be suppressed to a smaller extent, and unnecessary vibrations that occur in the glass plate 202 according to the stress distribution can be absorbed and suppressed to a smaller extent. As a result, the image that is deflected by the glass plate 202 can be prevented from being deflected in an unintended direction.

The material of the support unit 204 preferably includes resin specifically and is more preferably a material having resin as a main component. Since a material including resin has a sufficiently smaller modulus of elasticity than the material of the glass plate 202, the effect of the support unit 204 described above becomes more apparent.

Examples of the resin include polyethylene, polypropylene, silicone, polyacetal, polyamide, polycarbonate, polyphenylene ether, polyethylene terephthalate, polybutylene terephthalate, polyarylate, polysulfone, polyethersulfone, polyphenylene sulfide, polyetheretherketone, polyimide, polyetherimide, and fluorocarbon resin. The resin used herein includes at least one of these examples.

The same material as the above elastic material constituting the support unit 204 is preferably used as the material of the first shaft portion 210a and the second shaft portion 210b.

The material of the holding member 208 is not particularly limited. Examples of the material include various resin materials and various inorganic materials. Among these, various resin materials are preferably used as the material of the holding member 208. When the holding member 208 is integrated with the support unit 204 or the shaft portions 210a and 210b, the same material as the above elastic material constituting the support unit 204 is used as the material of the holding member 208.

Second Embodiment

Next, a description will be provided for an optical path deflecting element to which a second embodiment of the optical device according to the invention is applied.

Figure 12:
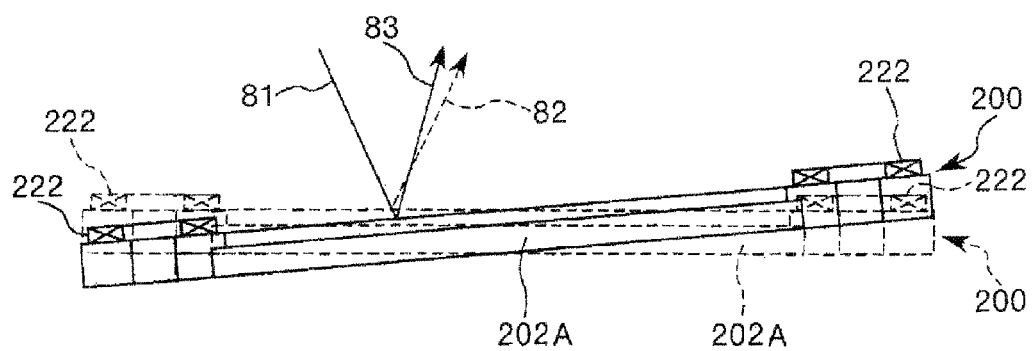
FIG. 12 is a diagram for describing a light deflection principle of an optical path deflecting element to which a second embodiment of the optical device according to the invention is applied.

FIG. 12 is a diagram for describing a light deflection principle of the optical path deflecting element to which the second embodiment of the optical device according to the invention is applied. In FIG. 12, the same configuration as that in the above embodiment is given the same reference sign.

The optical path deflecting element 2 according to the present embodiment is the same as the optical path deflecting element 2 according to the first embodiment except the light deflection principle in the optical unit.

That is, a glass plate 202A according to the present embodiment has light reflectivity, and this point is different from the first embodiment that has light transmissivity.

The glass plate 202A can be obtained by attaching a reflective film to the glass plate 202 according to the first embodiment.

The glass plate 202A does not oscillate when a voltage is not applied to the coil 222. Thus, as illustrated by a broken line in FIG. 12, the light 81 that is incident on the glass plate 202A is reflected (spatially modulated) as the light 82 illustrated by the broken line in the optical path deflecting element 2.

Meanwhile, the glass plate 202A is inclined as illustrated by a solid line in FIG. 12 when a predetermined voltage is applied to the coil 222. In other words, the direction of the voltage applied to each coil 222 is set so that each drive unit 220 exhibits this behavior. Since the angle of incidence of the light 81 that is incident on the glass plate 202A is changed when the glass plate 202A is inclined, the light 81 is reflected as the light 83 illustrated by a solid line. Therefore, the direction and the extent of deflection of the light 83 (reflective light) can be controlled by changing the attitude of the glass plate 202A so as to have an intended angle of incidence. Since the light 83 is spatially deviated from the light 82, the image that is formed by the light 83 is projected onto the screen 8 as deviated from the image that is formed by the light 82. As a result, a projector that is provided with the optical path deflecting element 2 has the same effect as the projector according to the first embodiment.

While the glass plate 202A according to the present embodiment has the configuration in which a reflective film is attached to the glass plate 202 according to the first embodiment, the configuration of the glass plate 202A is not particularly limited provided that the glass plate 202A has light reflectivity. The glass plate 202A may be formed by using a glossy material such as silicone and metal.

In the second embodiment described so far, the same action and effect as the first embodiment are achieved.

Third Embodiment

Next, a description will be provided for a light scanner to which a third embodiment of the optical device according to the invention is applied and a projector to which a third embodiment of the image display apparatus according to the invention is applied.

Figure 13:
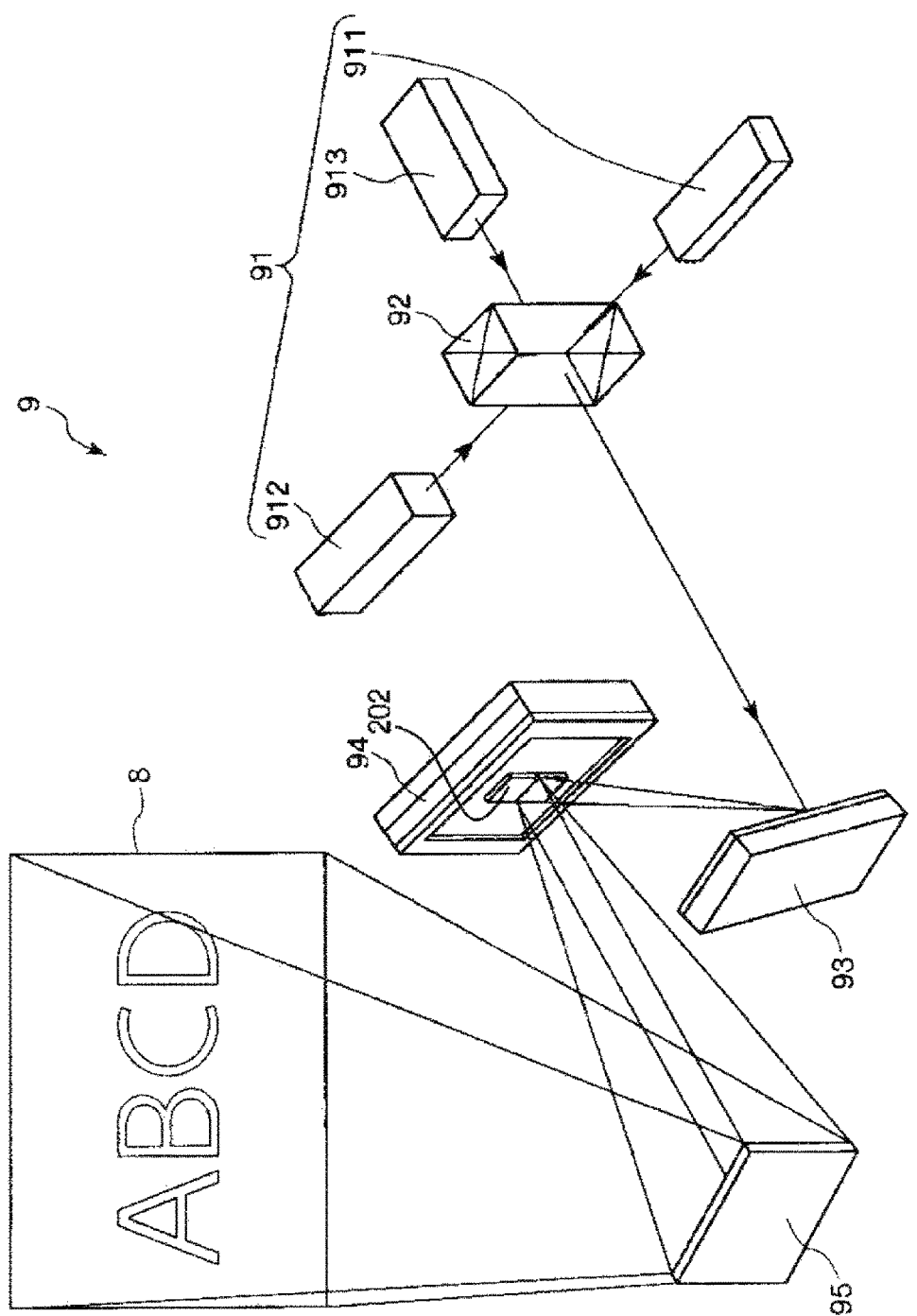
FIG. 13 is a diagram illustrating an optical configuration of a projector to which a third embodiment of the image display apparatus according to the invention is applied.

FIG. 13 is a diagram illustrating an optical configuration of the projector to which the third embodiment of the image display apparatus according to the invention is applied. In FIG. 13, the same configuration as that in the above embodiments is given the same reference sign.

A projector 9 according to the present embodiment is a scan-type projector that forms an image by scanning light. The projector 9 is the same as the projector 1 according to the first embodiment except that the projector 9 is provided with a light scanner 94 to which the third embodiment of the optical device according to the invention is applied.

That is, the projector 9 according to the present embodiment includes a light source device 91 such as a laser that emits light, a cross dichroic prism 92, a light scanner 93 that performs main scanning, the light scanner 94 that performs sub scanning (the third embodiment of the optical device according to the invention), and a fixed mirror 95.

The light source device 91 illustrated in FIG. 13 is provided with a red light source device 911 that emits red light, a blue light source device 912 that emits blue light, and a green light source device 913 that emits green light.

The cross dichroic prism 92 is configured by bonding four right angle prisms together and is an optical element that combines light emitted from each of the red light source device 911, the blue light source device 912, and the green light source device 913.

The projector 9 is configured as follows. Light is emitted from each of the red light source device 911, the blue light source device 912, and the green light source device 913 on the basis of image information from an unillustrated host computer. The light is combined by the cross dichroic prism 92. The combined light is scanned by the light scanners 93 and 94 and is then reflected by the fixed mirror 95 to form a color image on the screen 8.

Light scanning performed by the light scanners 93 and 94 will be specifically described here.

First, the light combined by the cross dichroic prism 92 is horizontally scanned by the light scanner 93 (main scanning). Then, the horizontally scanned light is further vertically scanned by the light scanner 94 (sub scanning). Accordingly, a two-dimensional color image can be formed on the screen 8. Using the optical device according to the invention as the light scanner 94 allows the light scanner 94 to exhibit an excellent drawing characteristic.

In the light scanner 94, the optical path can be deflected while the light is reflected by the glass plate 202. As described above, since unnecessary vibrations in the glass plate 202 can be effectively suppressed according to the invention, the scanning position of light that is scanned by the light scanner 94 can be precisely controlled. As a result, an excellent drawing characteristic can be obtained.

The projector 9, however, is not limited to the above configuration, and for example, the fixed mirror 95 may be omitted provided that the projector 9 is configured in a manner in which light is scanned by the light scanners 93 and 94 to form an image on a target object.

The optical device according to the invention may also be applied to the light scanner 93.

Fourth Embodiment

Next, a description will be provided for a head-mounted display to which a fourth embodiment of the image display apparatus according to the invention is applied.

Figure 14:
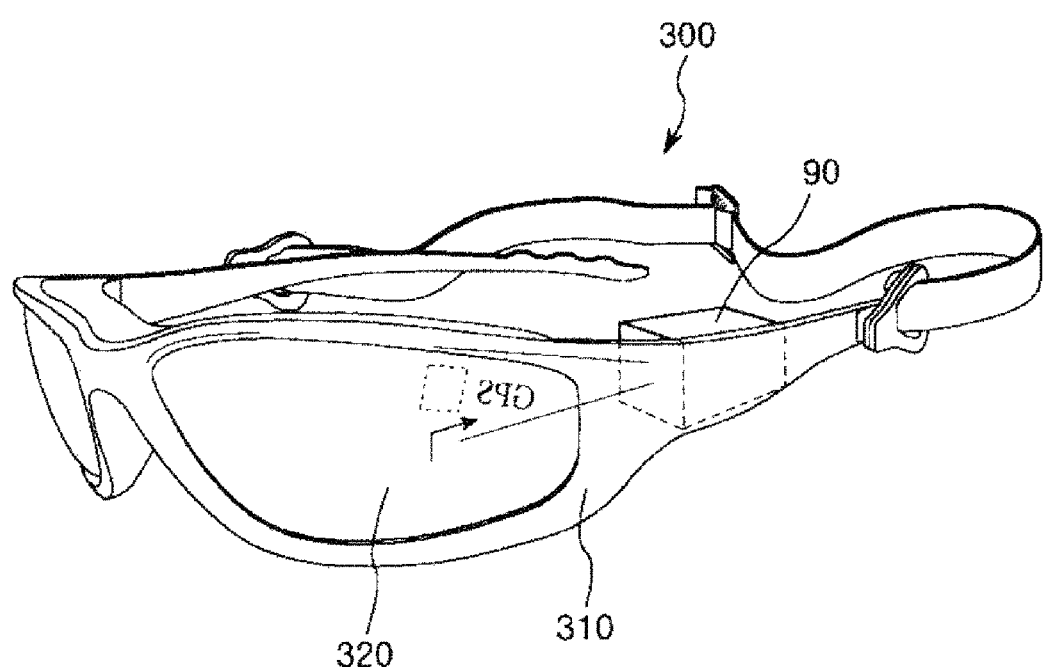
FIG. 14 is a diagram illustrating an optical configuration of a head-mounted display to which a fourth embodiment of the image display apparatus according to the invention is applied.

FIG. 14 is a diagram illustrating an optical configuration of the head-mounted display to which the fourth embodiment of the image display apparatus according to the invention is applied. In FIG. 14, the same configuration as that in the above embodiments is given the same reference sign.

A head-mounted display 300 illustrated in FIG. 14 includes glasses 310 and a video output unit 90 that is mounted on the glasses 310. The video output unit 90 has the same configuration as the projector 9 according to the third embodiment. The video output unit 90 displays a predetermined image that is viewed with one eye on a display unit 320 that is disposed at a part which is originally a lens of the glasses 310.

The display unit 320 may be transparent or may be opaque. When the display unit 320 is transparent, information from the video output unit 90 can be used as superimposed on information from the real world.

Two video output units 90 may be disposed in the head-mounted display 300, and an image that is viewed with both eyes may be displayed on two display units.

While the optical device and the image display apparatus according to the invention are described so far on the basis of the illustrated embodiments, the invention is not limited to the embodiments. For example, the configuration of each unit can be substituted by an arbitrary configuration having the same function, or another arbitrary configuration can be added to the configuration of each unit in the optical device and the image display apparatus according to the invention.

The invention may be a combination of two or more of arbitrary configurations (features) among the above embodiments.

The optical device according to the invention can also be applied to, for example, an optical switch and an optical attenuator besides an optical path deflecting element.

The image display apparatus according to the invention can also be applied to, for example, a printer and a head-up display (HUD) besides a projector.

The entire disclosure of Japanese Patent Application No. 2014-135870, filed Jul. 1, 2014 is expressly incorporated by reference herein.

What is claimed is:

1. An optical device comprising:
   an optical unit that is configured as a plate and includes a light incidence face on which light is incident;
   a support unit that includes a recessed arrangement portion in which the optical unit is arranged; and
   a first shaft portion and a second shaft portion that support the support unit in a manner which enables the support unit to oscillate,
   wherein a side face of the arrangement portion is separated from the optical unit between the optical unit and the first shaft portion and between the optical unit and the second shaft portion.

2. The optical device according to claim 1,
   wherein an adhesive is arranged at the separate part.

3. An image display apparatus comprising:
   the optical device according to claim 2.

4. The image display apparatus according to claim 3,
   wherein the optical device spatially modulating light forms an image by scanning the light.

5. The optical device according to claim 1,
   wherein the support unit further includes a notch portion between the optical unit and the first shaft portion, and
   an inner face of the notch portion constitutes a part of the side face of the arrangement portion.

6. The optical device according to claim 3,
   wherein an adhesive is arranged in the notch portion.

7. An image display apparatus comprising:
   the optical device according to claim 6.

8. An image display apparatus comprising:
   the optical device according to claim 5.

9. The optical device according to claim 1,
   wherein a planar shape of the arrangement portion is larger than a planar shape of the optical unit.

10. An image display apparatus comprising:
    the optical device according to claim 9.

11. The optical device according to claim 1,
    wherein the side face of the arrangement portion includes an abutting portion on which a side face of the optical unit abuts.

12. The optical device according to claim 11,
    wherein the optical unit is positioned in the arrangement portion by abutting on the abutting portion.

13. An image display apparatus comprising:
    the optical device according to claim 12.

14. An image display apparatus comprising:
    the optical device according to claim 11.

15. The optical device according to claim 1,
    wherein the support unit is configured of a material that has a smaller modulus of elasticity than a material which constitutes the optical unit.

16. The optical device according to claim 1,
    wherein the support unit is configured of a material that includes resin as a main component.

17. The optical device according to claim 1,
    wherein the optical unit transmits light.

18. The optical device according to claim 1,
    wherein the optical unit reflects light.

19. An image display apparatus comprising:
    the optical device according to claim 1.

20. The image display apparatus according to claim 19,
    wherein the image display apparatus is configured in a manner in which the optical device spatially modulating light shifts the position of a pixel that is displayed by irradiation with the light.

* * * * *